(No Model.)

J. W. BLODGETT.
FRICTION CLUTCH.

No. 432,473. Patented July 15, 1890.

Witnesses:
Harry T. Jones
Robert A. Millar

Inventor:
John W. Blodgett

UNITED STATES PATENT OFFICE.

JOHN W. BLODGETT, OF CHICAGO, ILLINOIS.

FRICTION-CLUTCH.

SPECIFICATION forming part of Letters Patent No. 432,473, dated July 15, 1890.

Application filed August 22, 1889. Serial No. 321,667. (No model.)

*To all whom it may concern:*

Be it known that I, JOHN W. BLODGETT, residing at Chicago, in the county of Cook and State of Illinois, and a citizen of the United States, have invented a new and useful Improvement in Friction-Clutches, of which the following is a specification, reference being had to the accompanying drawings, in which—

Figure 1:
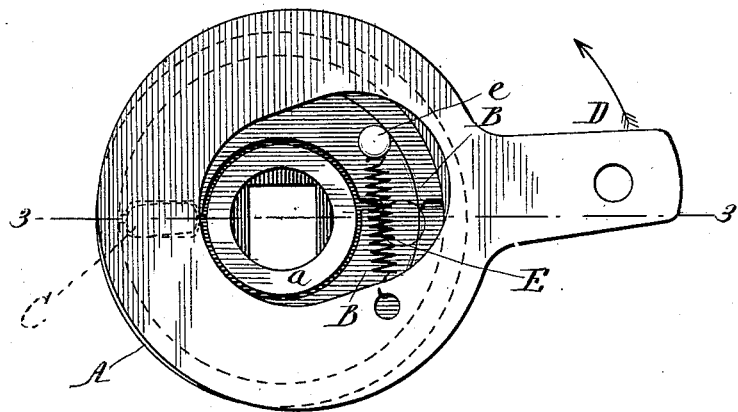
Figure 2:
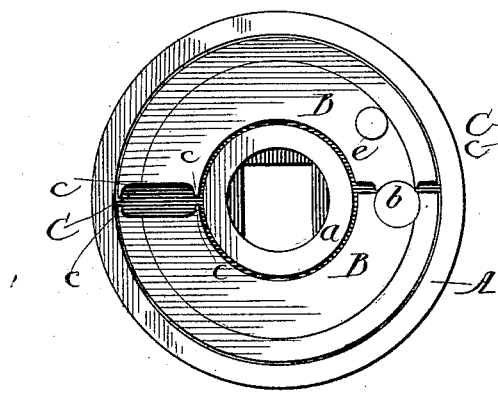
Figure 3:
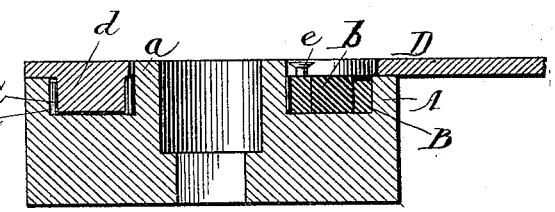
Figure 4:
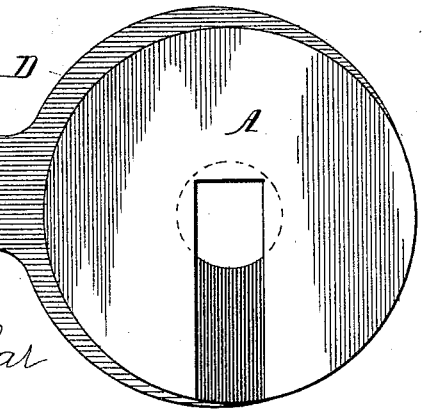

Figure 1 is a face view. Fig. 2 is a similar view with the arm removed. Fig. 3 is a section at line 3 3 of Fig. 1. Fig. 4 is a rear view.

This invention relates to friction-clutches.

Its object is to provide an improved friction-clutch which will be simple in construction and quick in action, which I accomplish as illustrated in the drawings and as hereinafter described.

That which I claim as new will be pointed out in the claims.

In the drawings, A represents a casing, which, as shown, is cylindrical in form. It is provided with an interior hub $a$ to receive any suitable shaft to be used for the purpose needed.

B B are two segments which form a ring which fits within the cylindrical casing A, as shown in Fig. 2. At one end one of the segments B is provided with a pin $b$, which fits into a recess in the adjoining end of the other segment, as clearly shown in Fig. 2. The opposite ends of the segments B are provided with a recess or opening C. The opening or recess C does not extend across the entire width of the segments B, thus leaving a projection or projections $c$ on each edge. The segments B are best formed by turning a ring to fit the cylindrical casing A, then inserting the pin $b$, and then cutting the ring into two segments and forming the recess or opening C. The ring is cut at a little distance to one side of the center of the pin $b$ in order to leave the pin $b$ securely held in one of the segments.

D is an arm or lever to which the power is applied. This arm or lever is provided with an oblong pin or stud $d$, which projects into the recess or opening C, as shown in Figs. 1 and 3.

E is a spring attached to the arm or lever D at one end and at its other end to a pin $e$, secured in one of the segments B.

The casing A, in the form shown in Figs. 3 and 4, and the lever D are designed to be used in connection with my button-hole attachment for sewing-machines; but it is evident that the device may be applied to many different uses, and in such applications the form of the casing A and the driving arm or lever D may be varied to suit the necessities of each different application. When the arm or lever is rotated in the direction indicated by the arrow in Fig. 1, the oblong pin or stud $d$ in the recess or opening C will force the ends of the segments apart, as indicated by dotted lines in Fig. 1, thereby forcing the exterior face of the segments B against and into clutching contact with the interior of the casing A, which will cause the casing A to rotate with the segments B and driving arm or lever D. The arm or lever D may be rotated in the opposite direction from that indicated by the arrow in Fig. 1 without rotating the casing A, or it may remain stationary while the casing itself rotates, for the reason that the spring E acts to draw the arm D and segment B, to which the spring is attached, nearer together, thereby bringing the oblong pin $d$ and oblong opening C into parallel position, which releases the clutch action of the segments B against the casing. The pin $e$ will be engaged by the arm D and the segments B will be thereby rotated without clutching. When the parts are moved with great rapidity and there is not sufficient time for the spring E to act, the engagement of the arm or lever D with the pin $e$ will move the segments B backwardly in relation to the casing. The spring E draws the segments B around sufficiently, when the arm D is not moving, to bring the oblong pin or stud $d$ into line with the sides of the recess or opening C, thus releasing the segments from clutching contact with the casing A. The pin $e$ may also serve as a stop for the arm or lever, preventing it from moving too far backward without carrying the segments B backward or around with it, at which time the segments will not be in clutching contact with the casing A. The pin $b$ forms a bearing between the ends of the segments at one side of the device, which bearing prevents the segments from being forced endwise by the action of the pin $d$ on the sides of the recess or opening C and binding against the hub $a$ or casing A. The projections $c$ prevent the pin $d$ from coming in contact with hub $a$ or casing A, and thus prevent wearing of the pin *d*. The segments B give a large surface for clutching contact with the casing, thereby securing a reliable clutch, and they require only a small spreading to cause the clutching contact, thereby permitting a very quick action. There should be friction enough on the casing A to prevent its backing when the arm or lever D is backed.

What I claim as new, and desire to secure by Letters Patent, is—

1. In a friction-clutch, the combination, with a casing and a driving arm or lever, of segments B, having a circular bearing between their adjoining ends on one side and a bearing on the opposite side by which the opposite ends may be spread by the said arm or lever, substantially as specified.

2. In a friction-clutch, the combination, with a casing and a driving arm or lever D, having a pin *d*, of segments B, having a recess or opening C at one point of meeting, and a round pin *b* in one segment and a circular recess in the other segment at the opposite point of meeting, substantially as specified.

3. In a friction-clutch, the combination, with a casing and a driving arm or lever, of segments B, having a bearing at one side and a recess at the opposite side, a pin on said arm, and a spring connecting said arm with one of the segments, substantially as specified.

4. In a friction-clutch, the combination, with a casing and a driving-arm D, provided with an oblong pin *d*, of segments B, having a recess C and a pin *e* on one of said segments adapted to engage with the arm D when moving backwardly relative to the casing, substantially as and for the purposes specified.

JOHN W. BLODGETT.

Witnesses:
HARRY T. JONES,
ROBERT A. MILLAR.